(12) United States Patent
Namuduri et al.

(10) Patent No.: US 11,015,564 B2
(45) Date of Patent: May 25, 2021

(54) STARTER FOR AN INTERNAL COMBUSTION ENGINE

(71) Applicant: GM Global Technology Operations LLC, Detroit, MI (US)

(72) Inventors: Chandra S. Namuduri, Troy, MI (US); Lei Hao, Troy, MI (US); Alexandru Rajala, Farmington Hills, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 15/961,137

(22) Filed: Apr. 24, 2018

(65) Prior Publication Data
US 2019/0323473 A1   Oct. 24, 2019

(51) Int. Cl.
*F02N 11/08* (2006.01)
*H02K 11/33* (2016.01)
*H02K 11/21* (2016.01)

(52) U.S. Cl.
CPC ...... *F02N 11/0859* (2013.01); *F02N 11/0851* (2013.01); *F02N 11/0862* (2013.01);
(Continued)

(58) Field of Classification Search
CPC ...... H02K 11/20; H02K 11/21; H02K 11/215; H02K 11/30; H02K 11/33; H02K 29/00;
(Continued)

(56) References Cited

U.S. PATENT DOCUMENTS 6,791,219 B1 * 9/2004 Eric ............... H02K 29/08
                                                  310/68 B
9,121,380 B2   9/2015 Fulton
(Continued)

FOREIGN PATENT DOCUMENTS

| CN | 2711983 Y | 7/2005 |
|---|---|---|
| CN | 101487434 A | 7/2009 |

(Continued)

OTHER PUBLICATIONS

Shinjo, Machine translation of jp2014075866, Apr. 2014 (Year: 2014).*

*Primary Examiner* — Quyen P Leung
*Assistant Examiner* — Eric Johnson
(74) *Attorney, Agent, or Firm* — Quinn IP Law (57) ABSTRACT

A starter assembly includes a multi-phase brushless electric motor including a stator, a rotor disposed on a rotatable shaft, and a motor endcap disposed at a first end of the stator. An electronic commutator assembly includes a sensing circuit, a control electronics subassembly, a power electronics subassembly and a heat sink. The sensing circuit is disposed adjacent to the second end of the rotatable shaft. The control electronics subassembly, the power electronics subassembly and the heat sink are disposed on disk-shaped devices arranged in a stacked configuration orthogonal to the axis defined by the rotatable shaft. The control electronics subassembly is disposed adjacent to the sensing circuit, and the power electronics subassembly is disposed adjacent to the control electronics subassembly. The control electronics subassembly is interposed between the power electronics subassembly and the sensing circuit. The heat sink is disposed adjacent to the power electronics subassembly.

19 Claims, 8 Drawing Sheets

(52) U.S. Cl.
CPC ...... *F02N 2011/0896* (2013.01); *H02K 11/21* (2016.01); *H02K 11/33* (2016.01)

(58) Field of Classification Search
CPC ........ H02K 29/03; H02K 29/06; H02K 29/08; H02K 29/14; F02N 11/0851; F02N 11/8059; F02N 11/8062; F02N 2011/0986; F02N 15/006
See application file for complete search history.

(56) References Cited

U.S. PATENT DOCUMENTS

| | | | | |
|---|---|---|---|---|
| 2002/0060105 A1* | 5/2002 | Tominaga | ............. | B62D 5/0406 180/443 |
| 2009/0246047 A1* | 10/2009 | Hattori | ................... | H02K 11/01 417/410.1 |
| 2013/0249356 A1* | 9/2013 | Nakano | ..................... | H02K 5/24 310/68 D |
| 2013/0257232 A1* | 10/2013 | Tomizawa | ............... | H02K 29/08 310/68 R |
| 2014/0009044 A1* | 1/2014 | Taniguchi | .............. | H02K 7/083 310/68 B |
| 2014/0091683 A1* | 4/2014 | Ito | ........................ | B62D 5/0406 310/68 R |
| 2015/0022044 A1* | 1/2015 | Chowdhury | ........... | H02K 1/148 310/156.53 |
| 2016/0036296 A1* | 2/2016 | Kabune | .................. | H02K 11/33 180/446 |
| 2016/0061175 A1* | 3/2016 | Bauer | ................... | F02N 15/046 74/6 |
| 2017/0117777 A1* | 4/2017 | Kamogi | ................. | H02K 11/33 |
| 2018/0030944 A1 | 2/2018 | Raad | | |
| 2018/0233992 A1* | 8/2018 | Takeuchi | ............... | H02K 11/33 |
| 2019/0126972 A1* | 5/2019 | Okamura | ................. | H02P 6/16 |
| 2019/0301893 A1* | 10/2019 | Ruigrok | ................. | G01D 5/145 |

FOREIGN PATENT DOCUMENTS

| | | | | |
|---|---|---|---|---|
| CN | 102159828 A | 8/2011 | | |
| CN | 102918258 A | 2/2013 | | |
| EP | 0619427 B1 | 10/1994 | | |
| JP | 2000104650 A | 4/2000 | | |
| JP | 2003148317 A | 5/2003 | | |
| JP | 2014075866 A | * | 4/2014 | |
| JP | 2014075866 A | | 4/2014 | |
| WO | WO-2016075789 A1 | * | 5/2016 | ............. H02K 11/33 |

* cited by examiner

STARTER FOR AN INTERNAL COMBUSTION ENGINE

INTRODUCTION

Internal combustion engines may have an electric starter that is disposed to turn a crankshaft leading up to a start event.

SUMMARY

A starter assembly for an internal combustion engine is described, and includes a multi-phase brushless electric motor including a stator, a rotor disposed on a rotatable shaft, and a motor endcap disposed at a first end of the stator. An engine mounting structure including a retractable pinion gear is coupled to a planetary gearset, and the engine mounting structure is disposed at a second end of the stator. An electronic commutator assembly is disposed on the motor endcap and includes a sensing circuit, a control electronics subassembly, a power electronics subassembly and a heat sink. The electronic commutator assembly is disposed in a cover. The rotatable shaft defines an axis. A first end of the rotatable shaft is coupled to the planetary gearset and a second end of the rotatable shaft projects through an aperture in the motor endcap. The sensing circuit is disposed adjacent to the second end of the rotatable shaft. The control electronics subassembly, the power electronics subassembly and the heat sink are disposed on disk-shaped devices arranged in a stacked configuration orthogonal to the axis defined by the rotatable shaft. The control electronics subassembly is disposed adjacent to the sensing circuit, and the power electronics subassembly is disposed adjacent to the control electronics subassembly. The control electronics subassembly is interposed between the power electronics subassembly and the sensing circuit. The heat sink is disposed adjacent to the power electronics subassembly and distal to the control electronics subassembly. The power electronics subassembly is thermally coupled to the heat sink. The power electronics subassembly and the control electronics subassembly each include an electrical ground and the electrical ground electrically connected via the motor endcap to the engine mounting structure. The power electronics subassembly includes a power inverter that is electrically connected to a DC power source. The control electronics subassembly is in communication with the starter inverter of the power electronics subassembly, and the power electronics subassembly is electrically connected to the stator of the multi-phase brushless electric motor.

An aspect of the disclosure includes a rotor position target disposed on the second end of the rotatable shaft, wherein the sensing circuit is disposed to monitor the rotor position target.

Another aspect of the disclosure includes the rotor position target being a radially magnetized ring magnet that is disposed on an end of the rotor shaft, and wherein the sensing circuit comprises an off-axis sensing circuit.

Another aspect of the disclosure includes the rotor position target being a diametrically magnetized magnet that is disposed on an end of the rotor shaft, and wherein the sensing circuit comprises an on-axis sensing circuit.

Another aspect of the disclosure includes a centrally located signal interface to effect communication between the power electronics subassembly and the control electronics subassembly.

Another aspect of the disclosure includes the pinion gear being disposed to translate along a rotatable member coupled to the rotor.

Another aspect of the disclosure includes the multi-phase brushless electric motor being a three-phase electric machine.

Another aspect of the disclosure includes a thermally conductive electrical insulator being interposed between the power electronics subassembly and the heat sink.

Another aspect of the disclosure includes a plurality of heat transfer vias disposed in a power circuit board to effect thermal communication between a portion of the power electronics subassembly and the heat sink.

Another aspect of the disclosure includes the thermally conductive electrical insulator being disposed to electrically isolate portions of the power electronics subassembly from the heat sink.

Another aspect of the disclosure includes the electronic commutator assembly being disposed in a cover.

Another aspect of the disclosure includes the control electronics subassembly and the power electronics subassembly being disposed on disk-shaped devices.

Another aspect of the disclosure includes the control electronics subassembly including a high-density printed circuit board including a plurality of gate drivers that are in communication with power switches that are disposed on the power electronics subassembly.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
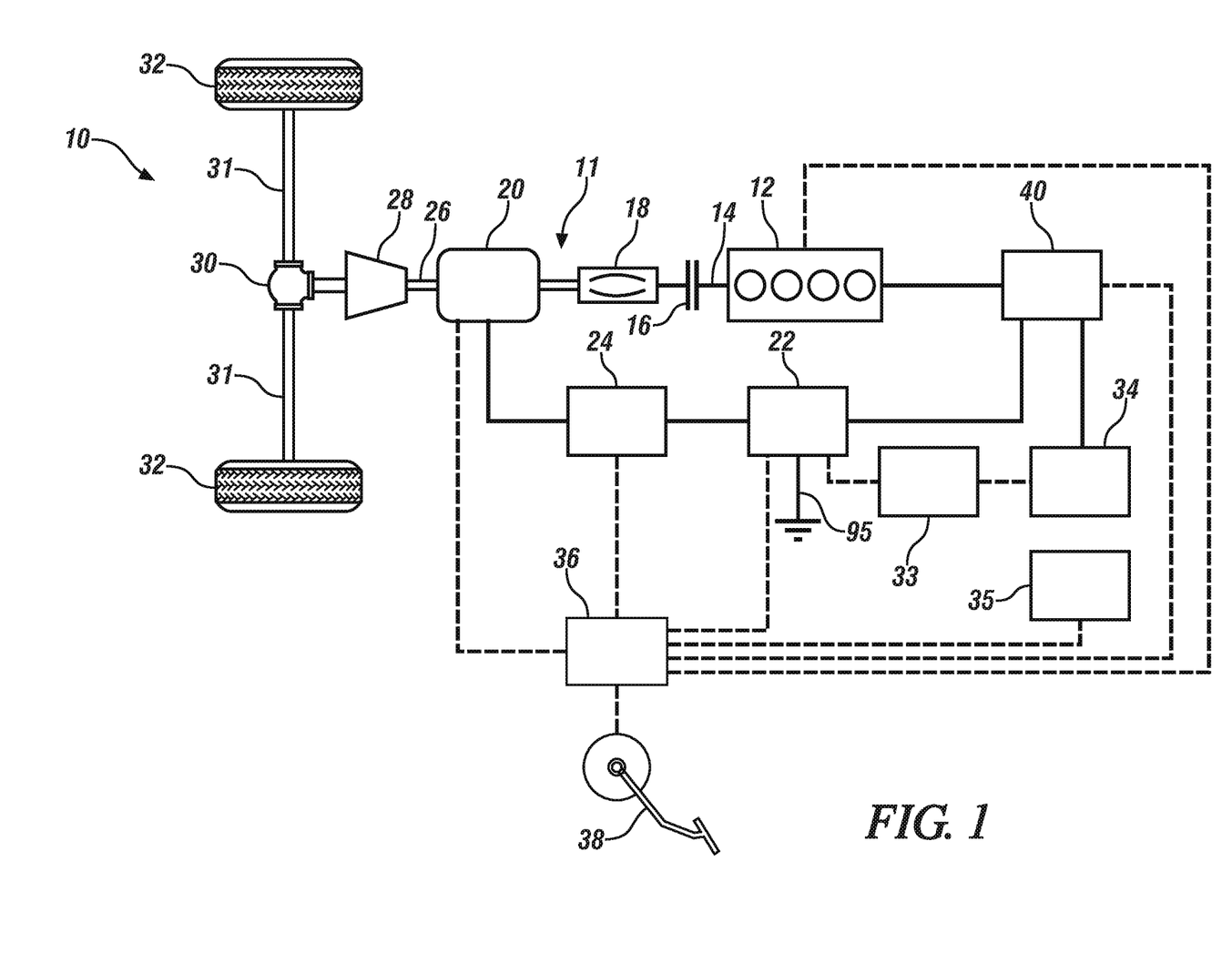
FIG. 1 schematically illustrates a vehicle including a propulsion system with an internal combustion engine and a brushless electric starter assembly therefor.

Referring to the drawings, wherein like reference numerals correspond to like or similar components throughout the several Figures, FIG. 1 shows a system schematic of a vehicle 10 having a driveline 11 that includes a powertrain. The vehicle 10 may have a propulsion system employing solely an internal combustion engine (engine) 12. Alternatively, the vehicle 10 may be a hybrid electric vehicle (HEV) having a powertrain employing both the engine 12 and an electric propulsion source. In the case of the HEV embodiment of the vehicle 10, either or both of the engine 12 and the electric propulsion source may be selectively activated to provide propulsion based on the vehicle operating conditions and other factors.

The engine 12 may be disposed on vehicle 10 in one embodiment, and the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the engine 12 may be disposed on a stationary power source.

The engine 12 transfers torque to a shaft 14. One or more decoupling mechanisms may be included along the shaft 14 to decouple torque output of the engine 12 from the remaining portions of the powertrain. A clutch 16 is provided to allow selection of partial or complete torque decoupling of the engine 12. The clutch 16 may be a friction clutch having a plurality of friction plates at least partially engaged when the clutch is closed to transfer torque, and disengaged when the clutch is opened to isolate torque flow between the downstream portions of the powertrain and the engine 12. A torque converter 18 may also be included to provide a fluid coupling between the output portion of engine 12 and downstream portions of the vehicle driveline 11. The torque converter 18 operates to smoothly ramp up torque transfer from the engine 12 to the rest of the driveline 11. Also, the torque converter 18 allows a decoupling of the engine 12, such that the engine 12 may continue to operate at low rotational speed without generating propulsion of the vehicle 10, e.g., at stationary idle conditions.

In the case of the HEV embodiment of the vehicle 10, the electric propulsion source may be a first electric machine 20 powered by a high-voltage external power source and energy storage system including a high-voltage traction battery 22, i.e., a DC power source. In one embodiment, a high-voltage traction battery is one that has an operating voltage that is rated at greater than about 36 volts but less than 60 volts. For example, the traction battery may be a lithium ion high-voltage battery with a nominal voltage of 48 volts. In the HEV embodiment of the vehicle 10, high-voltage direct current is conditioned by an inverter 24 before delivery to the first electric machine 20. The inverter 24 includes a number of switches and a control circuit operating to convert the direct current into three-phase alternating current to drive the first electric machine 20. A negative terminal of the high-voltage traction battery 22 electrically connects to a chassis ground 95.

Additionally, in the case of the HEV powertrain, the first electric machine 20 may have multiple operating modes depending on the direction of power flow. In a motor mode, power delivered from the high-voltage traction battery 22 allows the first electric machine 20 to generate output torque to a shaft 26. The output torque of the first electric machine 20 may then be transferred through a variable ratio transmission 28 to facilitate selection of a desired gear ratio prior to delivery of output torque to a final drive mechanism 30. The final drive mechanism 30 may be a multi-gear differential configured to distribute torque to one or more side- or half-shafts 31 coupled to wheels 32. The first electric machine 20 may be disposed either upstream of the transmission 28, downstream of the transmission 28, or integrated within a housing of the transmission 28.

The first electric machine 20 may also be configured to operate in an electric power generation mode to convert rotational motion of various driveline 11 components into electrical power, including for storage in the high-voltage traction battery 22. When the vehicle 10 is moving, whether propelled by the engine 12 or coasting from its own inertia, rotation of the shaft 26 turns an armature, or rotor, (not shown) of the first electric machine 20. Such rotational motion causes an electromagnetic field to generate alternating current that is passed through the inverter 24 for conversion into direct current. The direct current may then be provided to the high-voltage traction battery 22 to replenish its state of charge. A unidirectional or bidirectional DC-DC converter 33 may be used to charge a low-voltage (e.g., 12 volt) battery 34 and supply low voltage loads 35, such as 12 volt loads. When a bidirectional DC-DC converter 33 is used, it is possible to jumpstart the high-voltage traction battery 22 from the low-voltage battery 34. Either the low-voltage battery 34 or the high-voltage traction battery 22 may be employed to supply electric power to the starter 40 to spin and start the engine 12.

The various propulsion system components discussed herein may have one or more associated controllers to control and monitor operation. An electronic controller 36, although schematically depicted as a single controller, may also be implemented as a system of cooperative controllers to collectively manage the propulsion system. Multiple controllers may be in communication via a serial bus (e.g., Controller Area Network (CAN)) or via discrete conductors. The controller 36 includes one or more digital computers, each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various herein discussed propulsion system components. The controller 36 is in communication with the engine 12 and receives signals indicating engine speed, coolant temperature, and/or other engine operating conditions. The controller 36 may also be in communication with the first electric machine 20 and receive signals indicating motor speed, torque, and current draw. The controller 36 may also be in communication with the high-voltage traction battery 22 and receive signals indicating such status indicators as a battery state of charge (SOC), battery temperature, and current draw. The controller 36 may also receive signals indicating the circuit voltage across the high-voltage bus. The controller 36 may further be in communication with one or more sensors disposed to monitor driver input pedal(s) 38 to receive signals indicating a specific pedal position, which may reflect an acceleration demand by the driver. The driver input pedal(s) 38 may include an accelerator pedal and/or a brake pedal in one embodiment. In alternative embodiments such as a self-driving autonomous vehicle, acceleration demand may be determined by a computer either on-board the vehicle 10 or external to the vehicle.

As mentioned above, in the case of the HEV embodiment of the vehicle 10, either one or both of the engine 12 and the first electric machine 20 may be operated at a particular time based at least on the propulsion requirements of the subject vehicle. During high torque demand conditions, the controller 36 may cause both, the engine 12 and the first electric machine 20 to be activated, such that each of the propulsion sources provides respective output torque for simultaneous or combined propulsion of the vehicle 10. In certain moderate torque demand conditions, the engine 12 operates efficiently and may be used as the sole propulsion source. For example, during highway driving of the HEV at a relatively constant speed, the first electric machine 20 may be deactivated, such that only the engine 12 provides output torque.

Under other operating conditions of the HEV, the engine 12 may be deactivated, such that only the first electric machine 20 provides output torque. The clutch 16 may be opened to decouple the shaft 14 from the downstream portions of the powertrain. Specifically, during coast conditions where the HEV's driver allows the vehicle 10 to decelerate under driveline and road friction, as well as air resistance, the engine 12 may be deactivated and the first electric machine 20 operated in generator mode to recover energy. Additionally, even in a vehicle 10 using only the engine 12 for propulsion, deactivation of the engine 12 may be desirable during a temporary vehicle stop, such as at a traffic light. Instead of allowing the engine 12 to idle, fuel consumption may be reduced by deactivating the engine while the vehicle 10 is stationary. In both examples, it may be beneficial to rapidly restart the engine 12 in response to a subsequent resumption or increase of propulsion demand. A prompt startup of the engine 12 may avoid roughness and/or latency in power delivery being perceived by a driver of the vehicle 10.

The vehicle 10 also includes a second electric machine, hereafter referred to as starter assembly 40, which employs a multi-phase brushless electric motor 54. The starter assembly 40 is coupled to the engine 12, and is disposed to generate cranking torque as part of an engine starting routine, including being employed in an engine stop-start routine.

When the starter assembly 40 is engaged with the engine 12 leading up to an engine starting event, the starter assembly 40 turns a crankshaft of the engine 12 to facilitate a cold start or a restart thereof. Specifically, the starter assembly 40 is configured to engage with and selectively apply an input torque T to an external ring gear 12A that is attached to a crankshaft flywheel or flex-plate (not shown) of the engine 12, in order to spin the engine. According to aspects of the present disclosure, the controller 36 is programmed to issue a command to start the engine 12 using the starter assembly 40 in response to an acceleration demand, such as detected via sensor(s) (not shown) at driver input pedal(s) 38, following a period of reduced acceleration demand.

Figure 2:
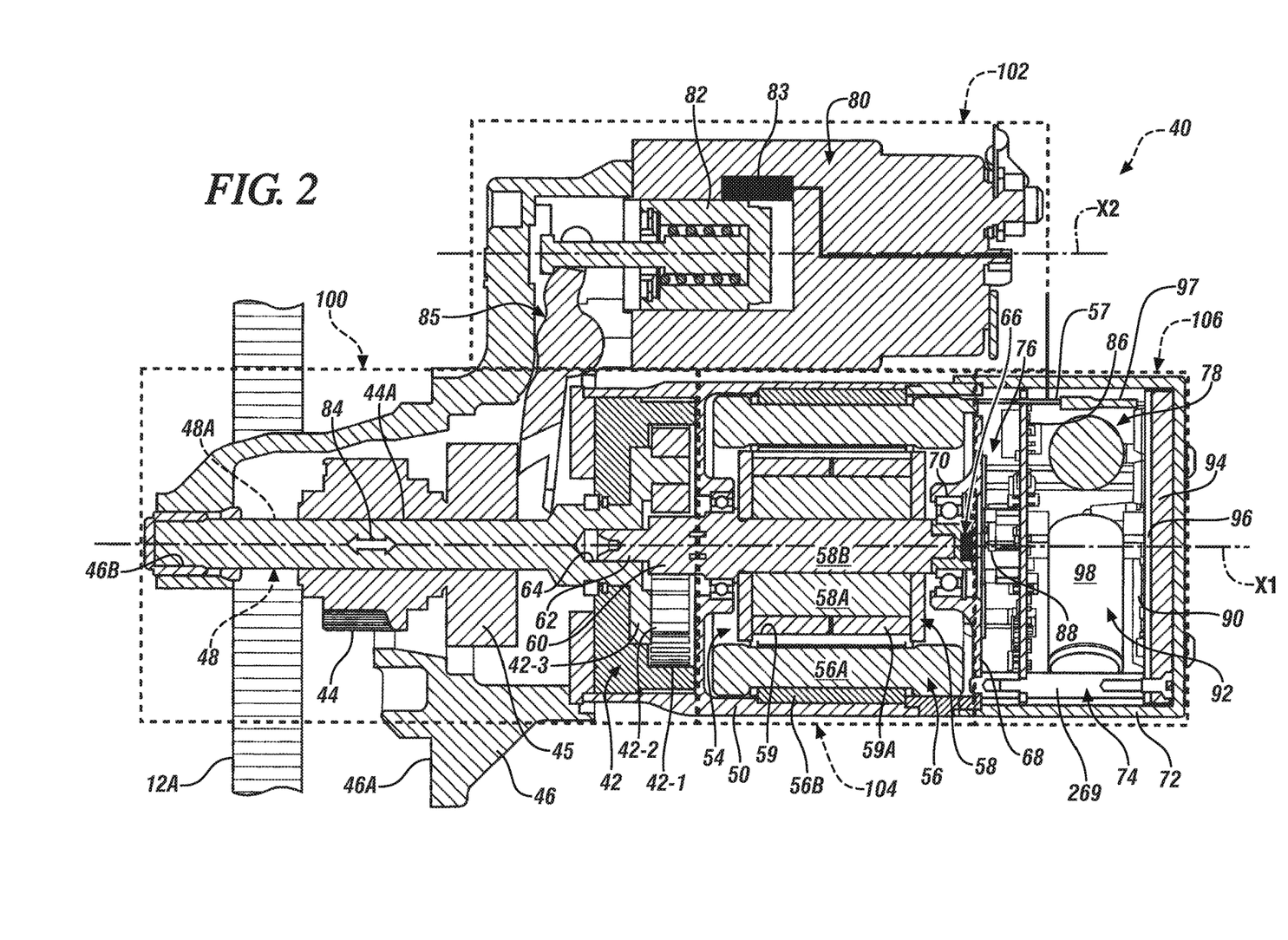
FIG. 2 illustrates a cross-sectional side view of the starter assembly shown in FIG. 1.
Figure 3:
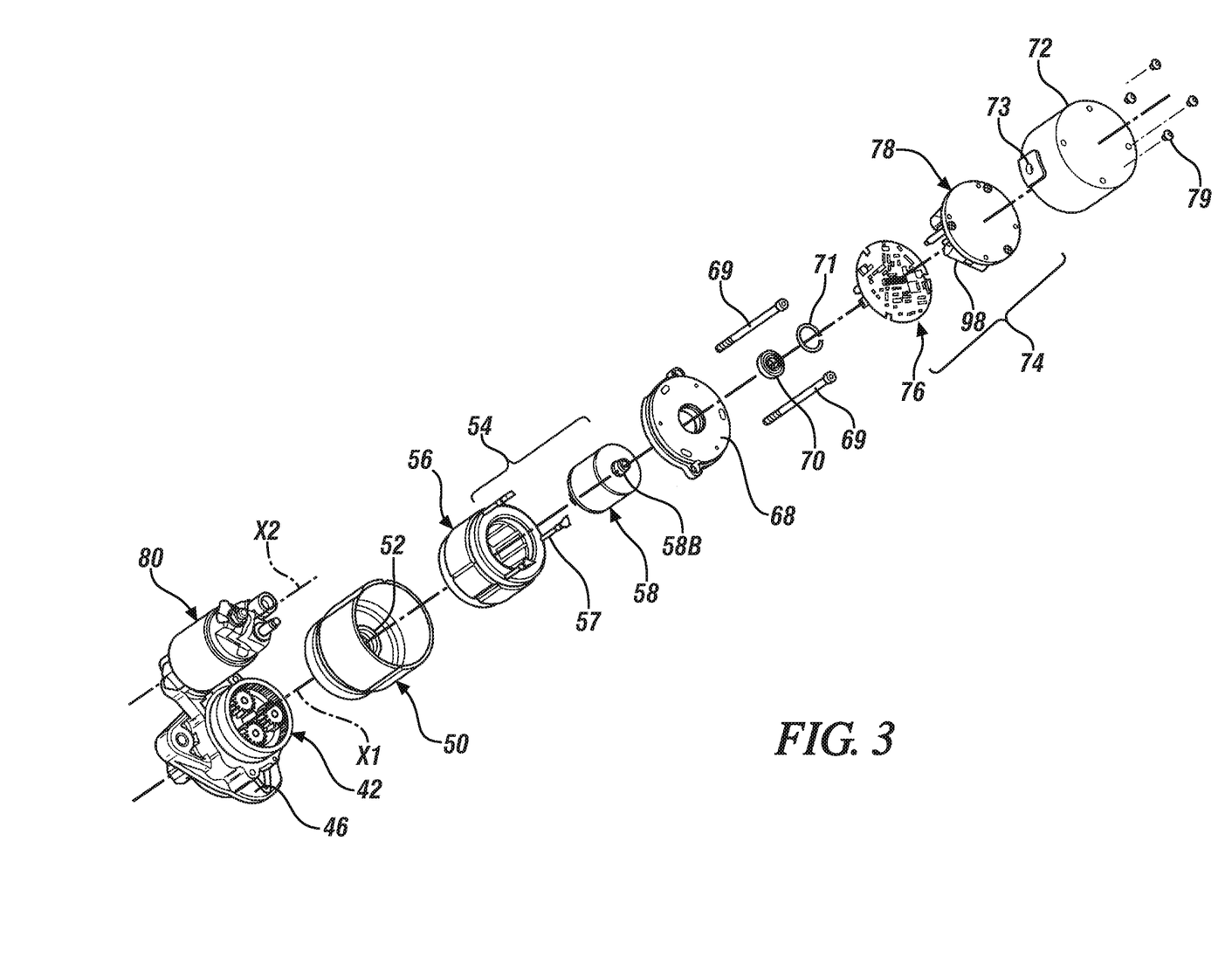
FIG. 3 illustrates an exploded isometric back view of the starter assembly shown in FIG. 2.
Figure 4:
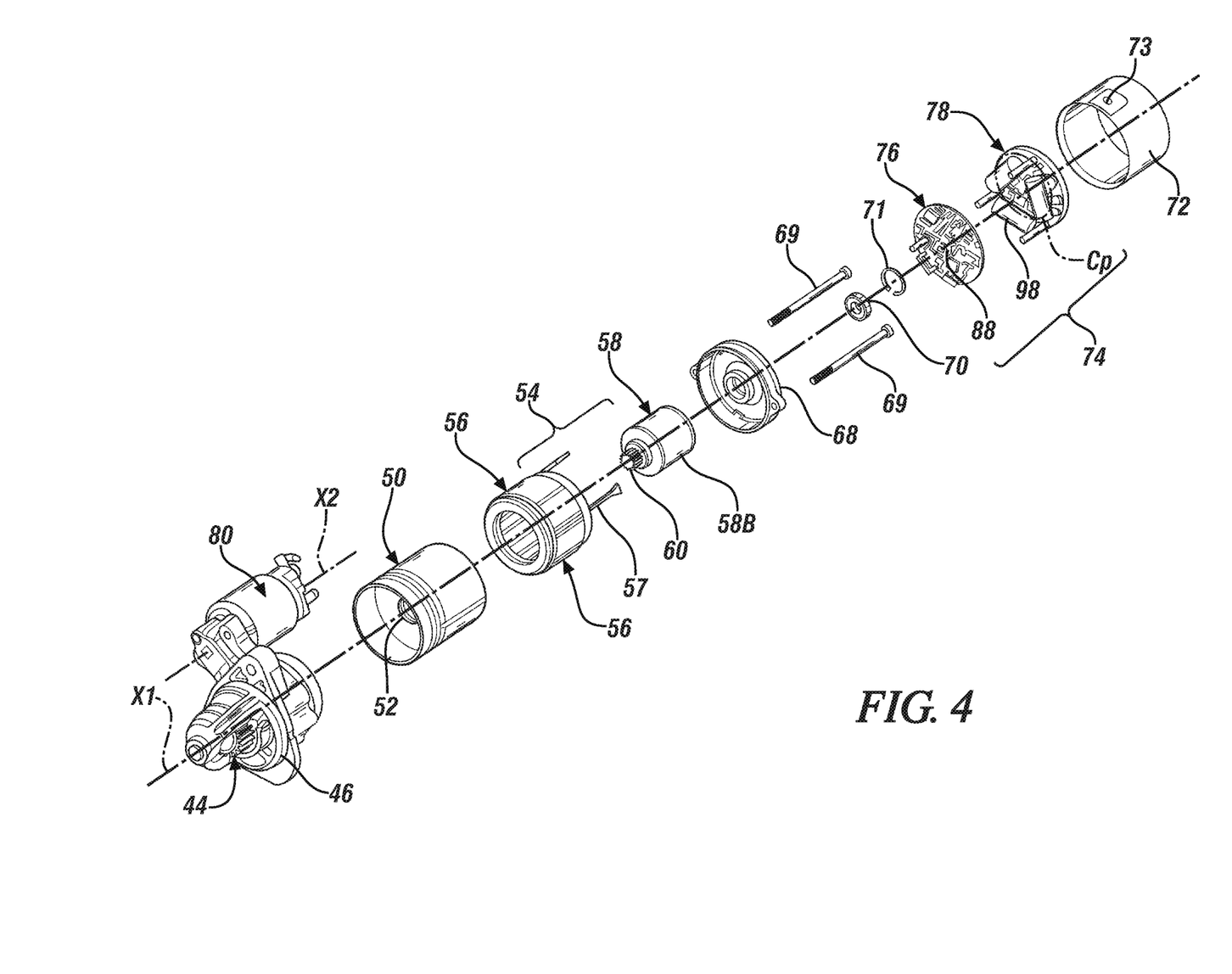
FIG. 4 illustrates an exploded isometric front view of the starter assembly shown in FIGS. 2 and 3.

As shown in FIGS. 2-4, the starter assembly 40 is configured as an on-axis electric machine. As defined herein, "on-axis" denotes that the starter assembly 40 is designed and constructed such that the starter's gear-train components, electric motor, and electronic commutator assembly are arranged on a common first axis X1. The starter assembly 40 includes a partial planetary gear set 42 operatively connected to a starter pinion gear 44 via a one-way clutch 45, which is configured to slide along the first axis X1. The partial planetary gear set 42 provides a required speed reduction, such as between 25:1 and 55:1, to output an appropriate amount of cranking torque at the engine crankshaft. As shown in FIGS. 2-4, the starter assembly 40 includes a gear-set casing 46 configured to house the partial planetary gear set 42 and having a mounting flange 46A for attachment to the engine 12 via appropriate fasteners.

The partial planetary gear set 42 includes an internal ring gear 42-1 fixed to the gear-set casing 46. The partial planetary gear set 42 further includes a plurality of pinion gears 42-2 in mesh with the internal ring gear 42-1, and a planet carrier 42-3 configured to hold the pinion gears. Specifically, the partial planetary gear set 42 may be directly connected to the starter pinion gear 44 through the one-way clutch 45 via a shaft 48. To such an end, the shaft 48 may include an external spline 48A, while the pinion gear 44 and the one-way clutch 45 include matching internal splines 44A, such that the pinion gear 44 and the one-way clutch 45 are enabled to slide along the pinion shaft when the pinion gear is pushed out for engagement with the ring gear 12A on the engine flywheel in one embodiment. As shown, the gear-set casing 46 is configured to support a nose of the shaft 48 via a bearing surface 46B.

The starter assembly 40 also includes a motor casing 50. The gear-set casing 46 may be fixed to the motor casing 50 together with a motor end cap 68, such as via a snap ring 71, which is shown with reference to FIG. 3. The motor casing 50 includes a first bearing 52 and is configured to house the brushless electric motor 54, which is a permanent magnet AC or DC electric motor. The brushless electric motor 54 may, for example, be one of a number of motor types, such as an induction machine, a surface mount permanent magnet (PM) machine, an interior PM machine, a synchronous reluctance machine, a PM assist synchronous reluctance machine, a drag-cup induction machine, or a switched reluctance machine. The brushless electric motor 54 may also be a radial or an axial flux machine. The wire selection on the brushless electric motor 54 may, for example include a single wire conductor, which may have a round, square, or rectangular cross-section, which may be used for concentrated or distributed winding.

As compared with brushed electric motors, brushless motors may exhibit prolonged service life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output. According to aspects of the present disclosure, the rotation of the starter assembly 40 output is synchronized with the rotation of the ring gear 12A to reduce noise, vibration, and harshness (NVH) which may occur during an engine 12 restart event.

Referring to FIG. 2 depicting a cross-section of the starter assembly 40, and in the exploded view in FIG. 3, the brushless electric motor 54 includes a multi-phase stator assembly 56 having a stator core 56B that is concentrically arranged inside the motor casing 50 with respect to the first axis X1. A number of windings 56A are provided on the stator core 56B to generate a rotating magnetic field. The windings 56A are electrically connected to a power electronics subassembly 78 of an electronic commutator assembly 74 by a plurality of phase leads 57, which are high-temperature (>240 C) rated insulated leads that project linearly outwardly from the electric motor 54, in parallel with the first axis X1 and project towards the electronic commutator assembly 74 to electrically connect therewith. The phase leads 57 are positioned on the outer circumference of stator assembly 56 and are positioned at 120 degrees of mechanical spacing. The brushless electric motor 54 also includes a rotor assembly 58 arranged for rotation inside the stator assembly 56. The rotor assembly 58 includes a rotor 58A. The brushless electric motor 54 is driven when the windings 56A are sequentially powered to create a rotating electromagnetic field, and the rotor assembly 58 is caused to rotate when the stator core 56B is thus energized.

The stator core 56B is cylindrical in shape, and defines a hollow central portion to receive the rotor 58A. According to at least one example, outer diameter of the stator core 56B may be limited to no greater than 80 millimeters. The rotor 58A is configured to rotate relative to the stator core 56B about the first axis X1. The rotor 58A may be formed in layers, or laminations, which are stacked in an axial direction along the first axis X1 where the lamination stack defines an active length of the starter assembly 40. According to one example, the lamination stack length is limited to be no greater than 40 millimeters. The overall size of the starter assembly 40 may be dependent on packaging constraints, such that a ratio of the outer diameter of the stator core 56B to the lamination stack length is within a range between about 1.5 and 3.5.

The rotor 58A may define a plurality of openings 59 disposed near the outer perimeter portion of the rotor, and each opening may be configured to hold a permanent magnet 59A. The openings 59 are sized to enhance manufacturability, for example having an opening width of at least about 2 millimeters. The plurality of permanent magnets 59A may be formed from a type of iron-based alloy, such as neodymium, and cooperate to generate a magnetic field which interacts with the stator when energized to cause movement of the rotor 58A. For example, each of the permanent magnets 59A may be rectangular in shape to enhance simplicity and reduce manufacturing costs. However, other magnet shapes may be suitable for specific application of the brushless electric motor 54, according to the present disclosure.

The permanent magnets 59A are arranged to create a number of magnetic poles around the rotor 58A. Each of the permanent magnets 59A is affixed within one of the openings 59 of the rotor 58A and functions as a magnetic pole of the rotating electric machine. Magnetic flux is generated in a direction normal to the body of the magnet 59A. The openings 59 of the rotor 58A may be shaped to include air gaps (not shown) on either side of each permanent magnet 59A. The air gaps between each pole may be sized to reduce flux leakage between the magnetic poles of the rotor 58A. Each permanent magnet 59A is oriented to have an opposing direction of polarity with respect to adjacent magnets in order to generate magnetic flux in opposite directions. The number of poles may be selected according to performance requirements of the brushless electric motor 54.

The rotor assembly 58 includes a shaft 58B. The shaft 58B is arranged on the first axis X1, supported by the first bearing 52, and directly connected to a sun gear 60 configured to engage the partial planetary gear set 42. As shown, the sun gear 60 may be integrally formed with the shaft 58B. A nose 62 of the shaft 58B may be piloted via a bearing surface 64 configured within the shaft 48, such that the shaft 48 and the shaft 58B each rotate about the first axis X1. The rotor assembly 58 also includes a rotor position target 66. As shown in FIG. 2, the rotor position target 66 may be configured as one or more radially or diametrically oriented magnets that are affixed to an end of the rotor shaft 58B. The target may also be fabricated from electrically conductive or soft magnetic materials for used with an inductive sensor with high frequency excitation on the sensor board in place of the Hall effect sensor.

The brushless electric motor 54 also includes a motor endcap 68 configured to mate with and enclose the motor casing 50. As shown in FIGS. 3 and 4, the motor endcap 68 may be fastened to the gear-set casing 46 via a plurality of bolts 69, and thus retain the motor casing 50 therebetween. The motor endcap 68 includes an aperture providing a mounting structure for a second bearing 70 that is configured to support the shaft 58B for rotation with respect to the first axis X1. As shown in in FIGS. 3 and 4, the snap ring 71 may be employed to retain the second bearing 70 within the aperture of the motor endcap 68. The brushless electric motor 54 additionally includes an electronics cover 72 having a power connector 73 (shown in FIGS. 3 and 4) for receiving electrical power from the high-voltage traction battery 22 and a control signal connector (not shown) for communicating with the engine controller to receive autostart and autostop commands. The electronics cover 72 is configured to mate with the motor endcap 68 and house or enclose the electronic commutator assembly 74. The electronic commutator assembly 74 includes a control electronics subassembly 76 and the power electronics subassembly 78, which are encapsulated in a thermally conductive dielectric material to mitigate mechanical shock and vibration, and provide a thermal path to the electronics cover 72 for thermal dissipation. The control electronics subassembly 76 is arranged between the motor endcap 68 and the power electronics subassembly 78. Accordingly, as shown, the brushless electric motor 54 is arranged or sandwiched between the partial planetary gear set 42 and the electronic commutator assembly 74, while the partial planetary gear set 42 is arranged between the starter pinion gear 44 and the electric motor 54. The electronics cover 72 may be attached to the power electronics subassembly 78 via appropriate fasteners, such as screws 79 shown in FIG. 3.

As shown in FIGS. 2-4, the starter assembly 40 additionally includes a solenoid assembly 80. The solenoid assembly 80 includes a pinion-shift solenoid 82 and actuator 83, and the pinion-shift solenoid 82 is arranged on a second axis X2 that is arranged parallel to the first axis X1. The solenoid assembly 80 is configured to be mounted and fastened to the gear-set casing 46, such as via a suitable fastener. The solenoid assembly 80 is further configured to shift or slide the starter pinion gear 44 and the one-way clutch 45 along the first axis X1, as indicated by arrow 84 for meshed engagement with the ring gear 12A to restart the engine 12 upon a command from the controller 36. The pinion-shift solenoid 82 may shift the starter pinion gear 44 and the one-way clutch 45, for example, via a lever arm 85 (shown in FIG. 2).

The control electronics subassembly 76 may include a processor circuit board 86 arranged perpendicular to the first axis X1, and one or more rotor position sensing circuits 88, such as a Hall effect sensor that is configured to monitor the rotor position target 66. The rotor position sensing circuit 88 is placed so as to maintain a predetermined distance (e.g., 0.5 mm to 1.5 mm) from the target magnet 66 at the end of the rotor shaft 58B. The power electronics subassembly 78 may include a power circuit board 90 arranged parallel to the processor circuit board 86, an electrical current ripple filter 92, and a heat sink 94 configured to absorb heat energy from the power circuit board 90. The power electronics subassembly 78 may additionally include a thermally conductive electrical insulator 96 arranged between the power circuit board 90 and the electrical current ripple filter 92. The electrical current ripple filter 92 may include a plurality of filter capacitors 98 arranged on a pitch circle Cp (shown in FIG. 4) centered on and perpendicular to the first axis X1. As shown in FIGS. 2-4, each of the plurality of filter capacitors 98 is arranged with a longitudinal axis that is parallel to the power circuit board 90, between the power circuit board 90 and the processor circuit board 86 along the first axis X1.

Embodiments of the rotor position sensor include raw angular position sensors that provide an incremental or absolute position signal. A position signal from an absolute position sensor is proportional to a true position regardless of whether the rotor is stationary or moving. An incremental position sensor detects positional changes. In one embodiment, the rotor position sensing circuit 88 for use in the present application includes the multiplying encoder or digital Hall sensors, e.g., using polymer-bonded, multi-pole magnets, and in which encoder/Hall pulses and commutation pulses are generated as signal outputs. The rotor position sensing circuit 88 also includes an intelligent microprocessor-based chip to extract and transmit the position signals. Another sensor is an analog Hall effect sensor, e.g., one using neodymium magnets, or other field-based sensors operable for generating sine and cosine signals as sensor outputs. Other sensor types generating similar sine and cosine outputs are inductive-type and reluctance-type position sensors, which forego the use of magnets in their operation.

The partial planetary gear set 42, along with the gear-set casing 46, and the starter pinion gear 44 and the one-way clutch 45 may be part of a first subassembly 100. The solenoid assembly 80 may be part of a second subassembly 102. The motor casing 50, the brushless electric motor 54, and the motor endcap 68 may be part of a third subassembly 104. The electronics cover 72 and the electronic commutator assembly 74 may be part of a fourth subassembly 106. According to the present disclosure, the first subassembly 100 may be configured to be pre-assembled with the second subassembly 102, the third subassembly 104 may be configured to be assembled with the pre-assembled first and second subassemblies 100, 102, and the fourth subassembly 106 is configured to be assembled with the pre-assembled first, second, and third subassemblies 100, 102, 104 to provide a complete electric starter assembly 40. Furthermore, prior to individual subassemblies being assembled into the starter assembly 40, each of the first, second, third, and fourth subassemblies 100, 102, 104, 106 may be separately and individually tested against respective preset operating parameters to verify each subassembly's required performance. In an alternative embodiment, portions of the electronic commutator assembly, e.g., the control electronics subassembly, the power electronics subassembly and/or the heat sink can be disposed at a location that is remote from the three-phase brushless electric motor, such as in the controller 36.

Figure 5:
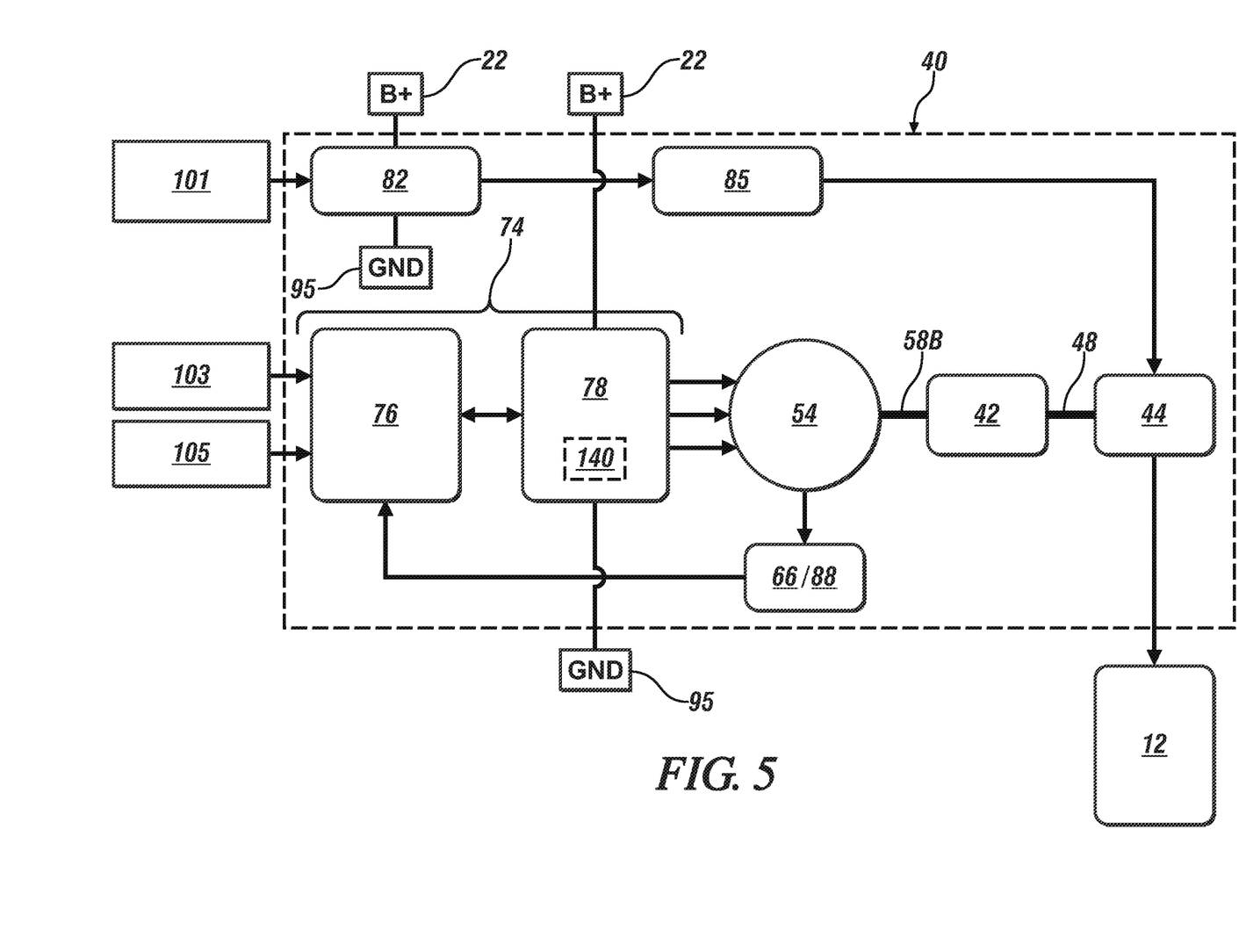
FIG. 5 schematically illustrates a control circuit associated with an embodiment of the starter assembly described with reference to FIGS. 2, 3 and 4.

FIG. 5 schematically illustrates a control circuit associated with an embodiment of the starter assembly 40 described with reference to FIGS. 2, 3, 4 and 8. The starter assembly 40 includes the brushless electric motor 54 including the rotor 58 and rotor shaft 58B that couples via the planetary gearset 42 and the one-way clutch 45 to the pinion shaft 48. The pinion gear 44 is slidably disposed on the pinion shaft 48. The pinion shift solenoid 82 is controllable to actuate the lever arm 85 to urge the pinion gear 44 to an extended position to meshingly engage the engine flywheel 12 in response to a pinion control signal 101 that may be generated by the controller 36 as part of an engine starting event. The electronic commutator assembly 74 includes the rotor position sensing circuit 88, the control electronics subassembly 76 and the power electronics subassembly 78. The control electronics subassembly 76 includes a DSP (digital signal processing) controller 120 that is in communication with a plurality of gate drivers 110 and the rotor position sensing circuit 88. The power electronics subassembly 78 includes a starter inverter 140 and other elements. In response to a starter motor control signal 103, the DSP controller 120 controls the gate drivers 110 to generate control signals that are communicated to power switches 142 of the starter inverter 140, which generate current signals that are transferred to the stator windings 56A of the stator 56 to generate a rotating magnetic field to urge the rotor 58A to rotate. Rotation of the rotor 58A and rotor shaft 58B is monitored by the rotor position sensing circuit 88. The controller 36 coincidentally generates the starter motor control signal 103 and the pinion control signal 101 to effect an engine starting event. The starter assembly 40 includes an externally accessible programming communication port 128 (shown with reference to FIG. 8), which is configured to send and receive messages 105.

Figure 6:
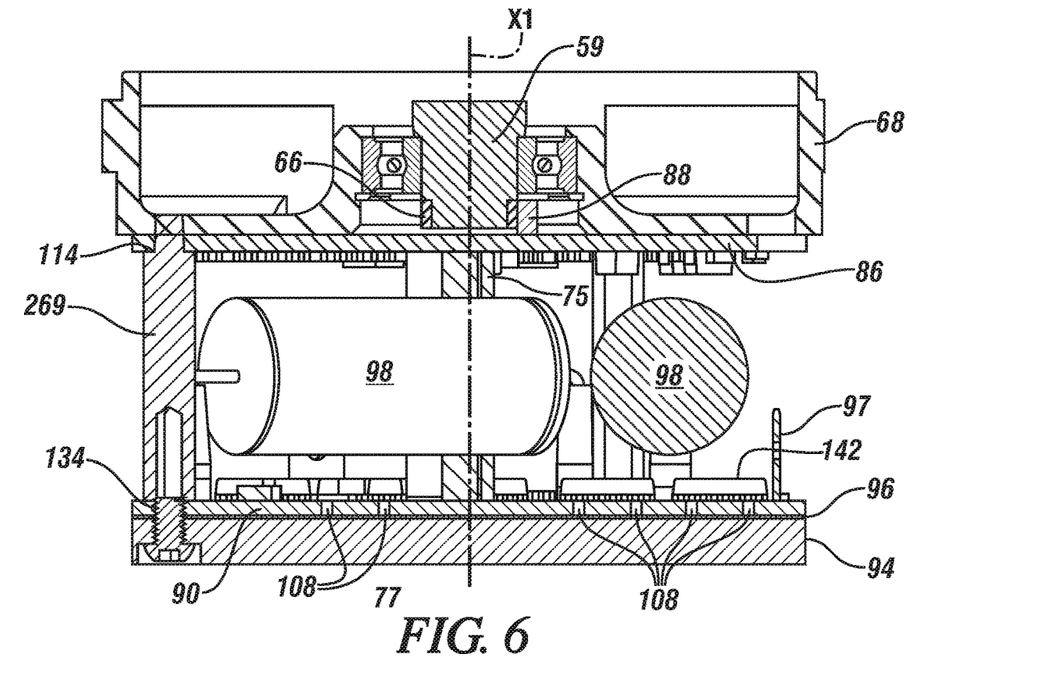
FIG. 6 illustrates a cutaway side view of one embodiment of an electronic commutator assembly including an off-axis position sensing circuit associated with an embodiment of the starter assembly described with reference to FIGS. 2, 3 and 4.

FIG. 6 illustrates a cutaway side view of one embodiment of the electronic commutator assembly 74, including an off-axis rotor position sensing circuit 88, a control electronics subassembly 76, a power electronics subassembly 78, a thermally conductive electrical insulator 96, and a heat sink 94. The off-axis rotor position sensing circuit 88, control electronics subassembly 76, power electronics subassembly 78, thermally conductive electrical insulator 96, and heat sink 94 are arranged in a stack, oriented orthogonal on the first axis X1, and enclosed in the cover 72 (shown with reference to FIGS. 2, 3 and 4). The motor endcap 68 may be fastened to the gear-set casing 46 via a plurality of bolts 269. The rotor shaft 58B projects through an aperture in the motor endcap 68. The rotor position target 66 is configured as a radially magnetized ring magnet that is disposed on an end of the rotor shaft 58B by being press-fit onto a shoulder that is formed on an end of the motor endcap 68 in one embodiment. The ring magnet is 3-5 mm in axial length, and may have a single N-S pole arrangement, or alternatively, multiple N-S pole arrangements. The off-axis rotor position sensing circuit 88 is disposed adjacent to the radially magnetized ring magnet at the end of the rotor shaft 58B at a predetermined spacing. Alternatively (shown with reference to FIG. 7), the rotor position target may be arranged as a diametrically magnetized magnet that is disposed on an end of the rotor shaft and an associated on-axis sensing circuit 89.

The control electronics subassembly 76 is disposed on a disk-shaped processor circuit board 86 and includes a plurality of gate drivers 110, which are controlled via a DSP controller 120 to provide pulsewidth-modulated control signals. This arrangement is shown with reference to FIG. 8. The control electronics subassembly 76 is disposed adjacent to the off-axis rotor position sensing circuit 88, and is interposed between the power electronics subassembly 78 and the off-axis rotor position sensing circuit 88.

The power electronics subassembly 78 is disposed on a disk-shaped power circuit board 90 and includes a starter inverter 140 including a plurality of power switches 142. The power electronics subassembly 78 is disposed adjacent to the control electronics subassembly 76 and is thermally coupled to the heat sink 94.

The control electronics subassembly 76 communicates with the power electronics subassembly 78 via a centrally located interface connection which is formed by connection between a first connector 75 that is mounted on the control electronics subassembly 76 and a second connector 77 that is mounted on the power electronics subassembly 78. The plurality of gate drivers 110 of the control electronics subassembly 76 communicates the pulsewidth-modulated control signals to individual ones of the power switches 142 of the starter inverter 140 to effect and control output current magnitude and phase control.

The thermally conductive electrical insulator 96 is a device that is formed from thermally-conductive, electrical-insulative materials, and is disposed to electrically isolate portions of the power electronics subassembly 78 from the heat sink 94. The thermally conductive electrical insulator 96 is interposed between the heat sink 94 and the power electronics subassembly 78, and a plurality of thermal vias 108 are disposed through the power circuit board to connect between the power electronics subassembly 78 and the heat sink 94 to transfer heat from selected areas of the power electronics subassembly 78 to the heat sink 94.

The heat sink 94 is a disk-shaped device formed from thermally conductive materials. The heat sink 94 is disposed proximal to the power electronics subassembly 78 and distal to the control electronics subassembly 76, and is arranged to conduct heat away from the power electronics subassembly 78.

A plurality of phase terminals 97 project outwardly, orthogonal to the surface of the power circuit board 90. When the brushless electric motor 54 is arranged as a three-phase motor, there are three phase terminals 97, each being associated with one of the phases thereof. Each of the phase terminals 97 is electrically connected to one of the legs of the starter inverter 140 to conduct phased current. Each of the phase terminals 97 is arranged to electrically connect to a corresponding one of the phase leads 57 that are electrically connected to the windings 56A of the multi-phase stator assembly 56 to conduct the phased current thereto to generate a rotating magnetic field.

The power circuit board 90 of the power electronics subassembly 78 includes a plurality of plated pass-through mounting holes 134 that are electrically connected to a circuit ground for the various elements of the power electronics subassembly 78.

The processor circuit board 86 of the control electronics subassembly 76 includes a plurality of plated pass-through mounting holes 114 that are electrically connected to a circuit ground for the various elements of the control electronics subassembly 76. The bolts 269 are disposed to pass through the plated pass-through mounting holes 114 and 134 to secure the control electronics subassembly 76 and the power electronics subassembly 78 to the motor endcap 68, and also provide an electrical ground path to the chassis ground 95, which electrically connects to a negative terminal of a DC power source, e.g., the high-voltage traction battery 22 and the low-voltage auxiliary battery 34.

Figure 7:
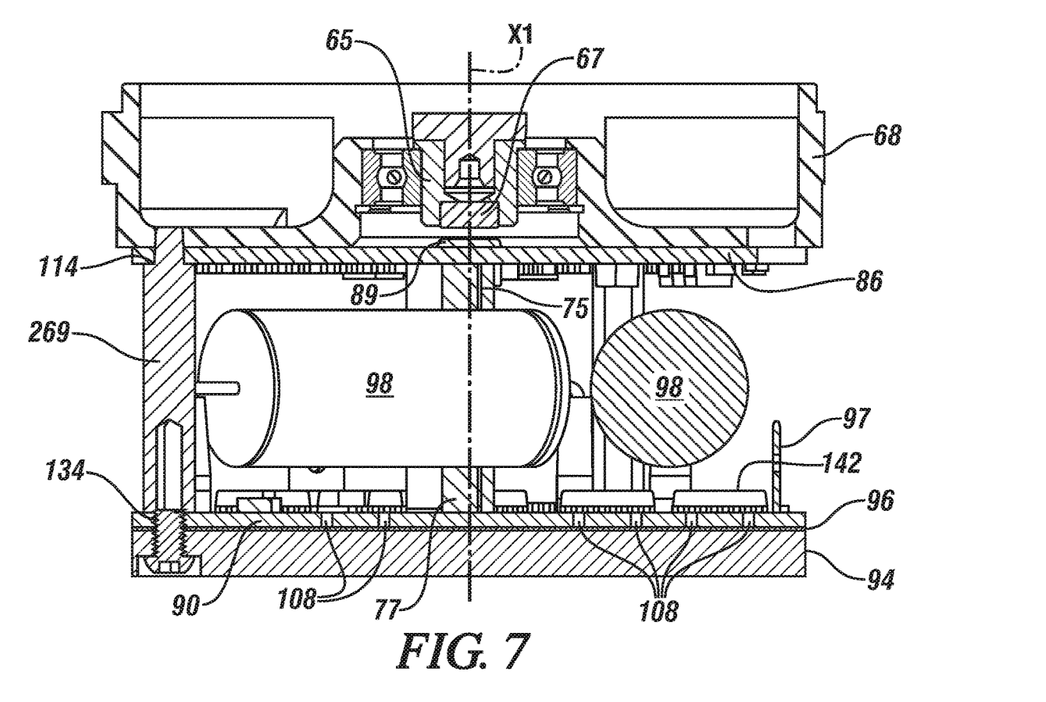
FIG. 7 illustrates a cutaway side view of another embodiment of an electronic commutator assembly including an on-axis position sensing circuit, associated with an embodiment of the starter assembly described with reference to FIGS. 2, 3 and 4.

FIG. 7 illustrates a cutaway side view of another embodiment of the electronic commutator assembly 74, including an on-axis position sensing circuit 89, the control electronics subassembly 76, the power electronics subassembly 78, the thermally conductive electrical insulator 96, and the heat sink 94. The on-axis position sensing circuit 89, control electronics subassembly 76, power electronics subassembly 78, thermally conductive electrical insulator 96, and heat sink 94 are arranged in a stack, oriented orthogonal on the first axis X1, enclosed in the cover 72 (shown with reference to FIGS. 2, 3 and 4). The rotor shaft 58B projects through an aperture in the motor endcap 68. A non-ferric holder 65 is disposed on the end of the rotor shaft 58B, and provides a mounting surface for an embodiment of the rotor position target in the form of a diametrically magnetized magnet 67. The diametrically magnetized magnet 67 is arranged as a disk-shaped device that has 6-8 mm in diameter and has a single N-S pole arrangement. The diametrically magnetized magnet 67 is arranged to have close proximity to the on-axis position sensing circuit 89. In one embodiment, the diametrically magnetized magnet 67 is arranged to have an axial air gap that is less than 1 to 1.5 mm from the on-axis position sensing circuit 89, with a minimum axial air gap spacing of at least 0.2 mm. Other aspects of this embodiment are the same as those described with reference to FIG. 6.

Figure 8:
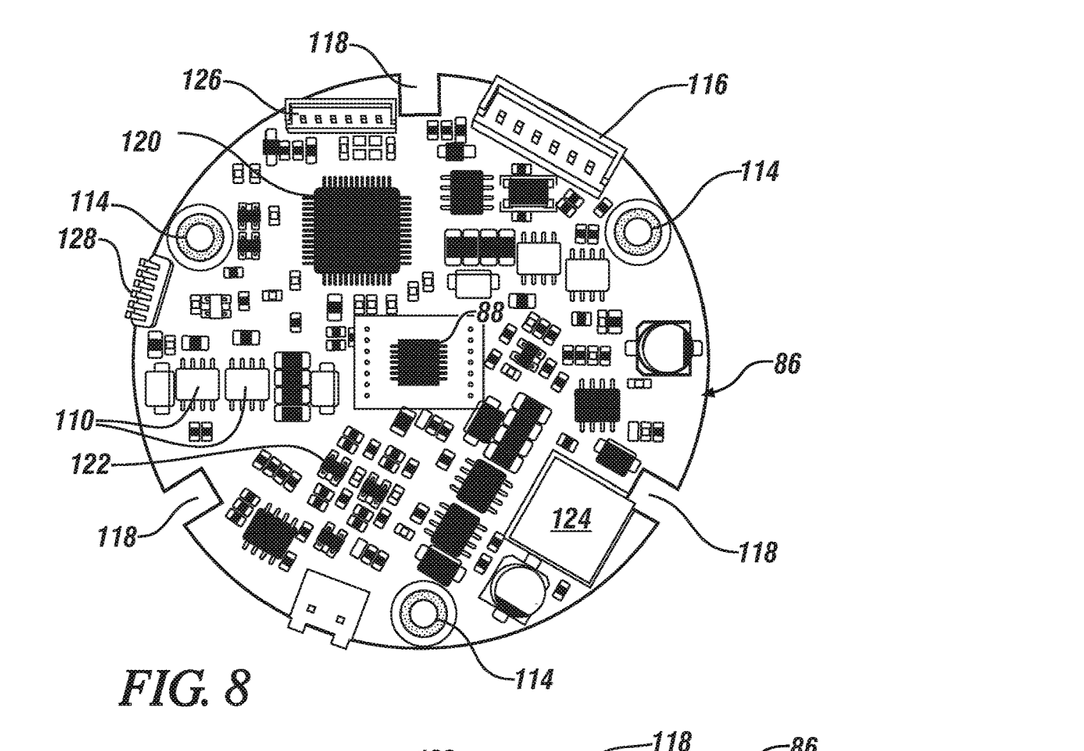
FIG. 8 illustrates a plan view of a first side of an embodiment of a processor circuit board for a control electronics subassembly associated with an embodiment of the starter assembly described with reference to FIGS. 2, 3 and 4.

FIG. 8 schematically shows a first side of an embodiment of the processor circuit board 86 for the control electronics subassembly 76, including (as shown) the on-axis position sensing circuit 89 being disposed thereon and in communication therewith. The processor circuit board 86 is arranged as a high-density printed circuit board having a plurality of surface-mounted integrated circuit chips arranged thereon, including the DSP controller 120, gate drivers 110 that function as driver circuits for the power switches 142, current sensor amplifiers 122, an externally accessible programming communication port 128, a second communication port 116 in communication with the electronic controller 36, and a voltage regulator 124 that is disposed to supply low-voltage regulated electric power to the various electronic devices. Mechanical features on the processor circuit board 86 include a plurality of gap portions 118 that are disposed on the outer circumference thereof, which accommodate pass-through of the phase leads 57. Three plated pass-through mounting holes 114 are also indicated.

Figure 9:
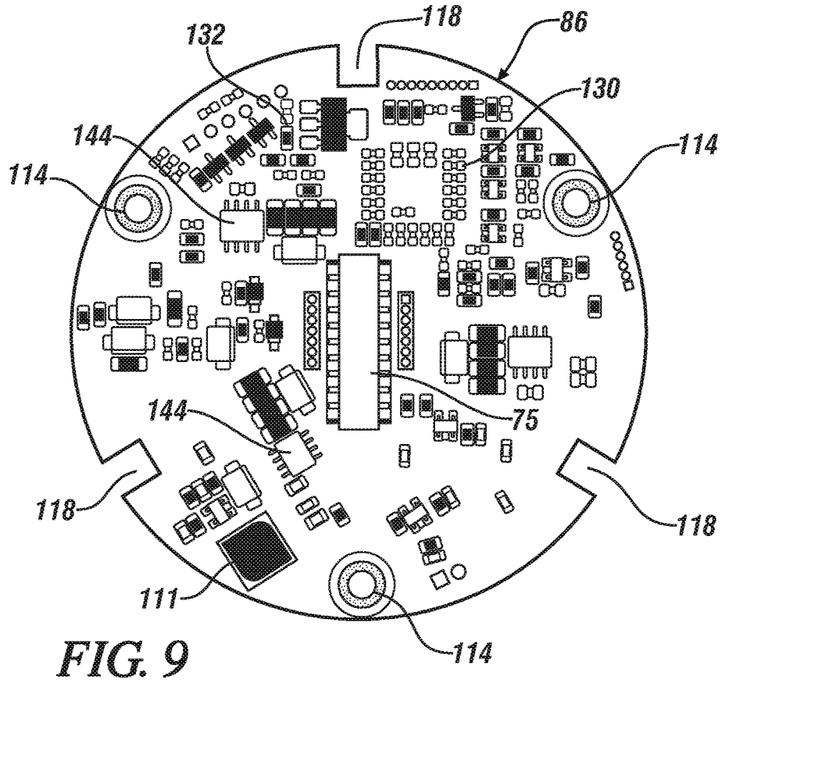
FIG. 9 illustrates a plan view of a second side of an embodiment of a processor circuit board for a control electronics subassembly associated with an embodiment of the starter assembly described with reference to FIGS. 2, 3 and 4.

FIG. 9 schematically shows a second, opposite side of the embodiment of the processor circuit board 86 for the control electronics subassembly 76. The processor circuit board 86 is arranged as a high-density printed circuit board having a plurality of surface-mounted integrated circuit chips arranged thereon, including a processor power supply 132, power switch driver circuits 144 for the power switches 142 of the starter inverter 140, a gate driver power supply 111, noise decoupling capacitors 130, the first connector 75, the gap portions 118 that are disposed on the outer circumference thereof and the plated pass-through mounting holes 114. The control electronics subassembly 76 communicates with the power electronics subassembly 78 via the centrally located interface connection which is formed by connection between the first connector 75 and the second connector 77 that is mounted on the power electronics subassembly 78. The arrangement of the power electronics subassembly 78 in relation to the control electronics subassembly 76 achieves a desired separation that mitigates electromagnetic interference and heat transfer therebetween.

Figure 10:
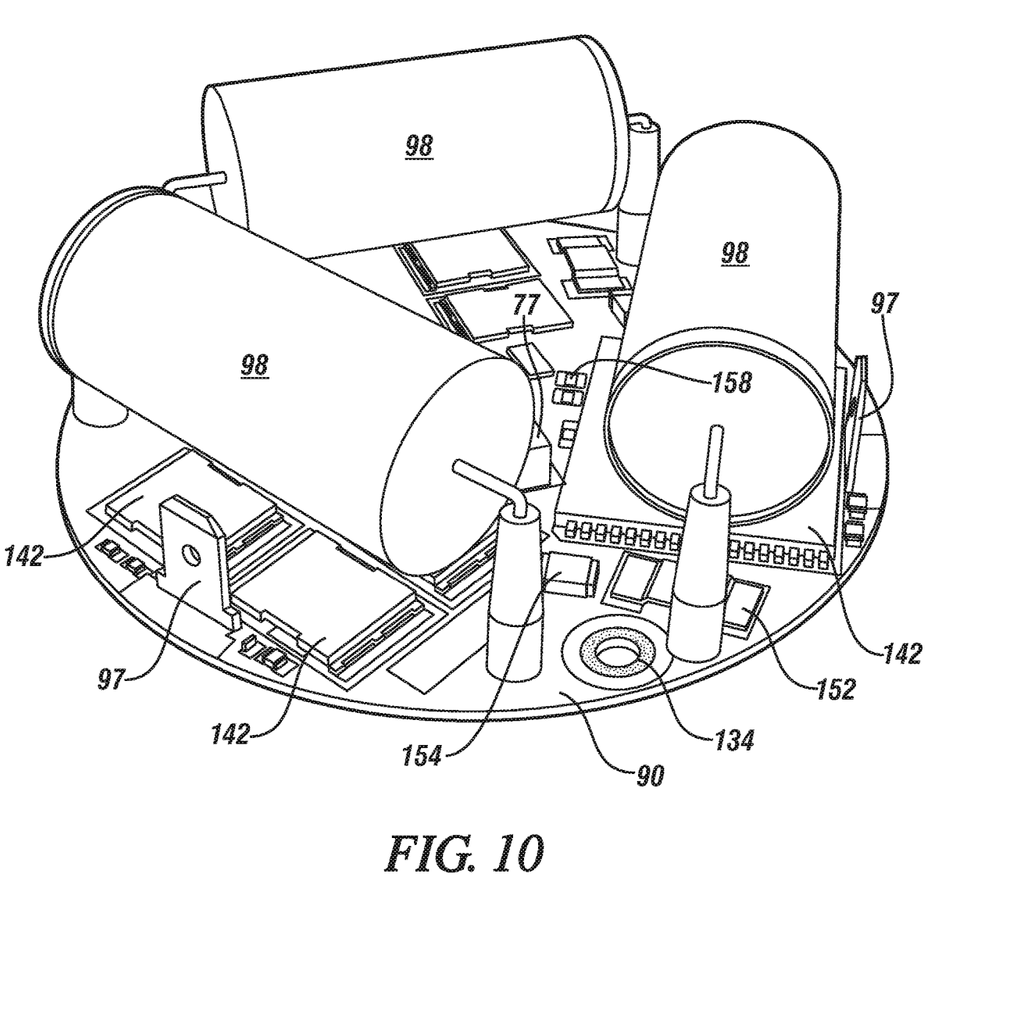
FIG. 10 illustrates an isometric view of an embodiment of the power electronics subassembly associated with an embodiment of the starter assembly described with reference to FIGS. 2, 3 and 4.

FIG. 10 schematically shows an isometric view of an embodiment of the power electronics subassembly 74 that is disposed on a disk-shaped power circuit board 90 and includes a starter inverter 140 including a plurality of power switches 142. The arrangement of elements on the power electronics subassembly 74 provides a high density device with low parasitic resistance, low inductance, and a symmetrical arrangement of components in a phased arrangement. The power electronics subassembly 78 includes the second connector 77, power switches 142 of the starter inverter 140, filter capacitors 98, temperature sensor 158, and phase leg current sensors 152 (one of which is shown). Phase terminals 97, which project outwardly, are disposed orthogonal to the surface of the power circuit board 90 to electrically connect corresponding ones of the phase leads 57 that are electrically connected to the windings 56A of the multi-phase stator assembly 56 to conduct the phased current thereto to generate a rotating magnetic field when the electronic commutator assembly 74 is assembled onto the third subassembly 104 of the starter assembly 40. The power switches 142 are low-inductance surface mount solid state switches that are mounted on the power circuit board 90 with the thermally conductive electrical insulator 96 interposed therebetween. Portions of the power switches 142 thermally communicate with the heat sink 94 employing the vias 108 for heat conduction and heat dissipation. Plated pass-through mounting holes 114 (one of which is shown) that is electrically connected to a circuit ground for the various elements of the power electronics subassembly 78. A second low inductance capacitor 154 is electrically connected to each phase leg of the starter inverter 140, and is configured to suppress high frequency electromagnetic interference. Each current sensor 152 is disposed to monitor current flow on one phase leg of the starter inverter 140.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A starter assembly for an internal combustion engine, comprising:
a multi-phase brushless electric motor including a stator, a rotor disposed on a rotatable shaft, and a motor endcap disposed at a first end of the stator;
an engine mounting structure including a retractable pinion gear, the engine mounting structure being disposed at a second end of the stator; and
an electronic commutator assembly disposed on the motor endcap and including a sensing circuit, a control electronics subassembly, a power electronics subassembly and a heat sink;
wherein:
the rotatable shaft defines an axis,
a second end of the rotatable shaft is couplable to the pinion gear,
a first end of the rotatable shaft projects through an aperture in the motor endcap,
the sensing circuit is disposed to monitor a rotational position of the rotatable shaft,
the control electronics subassembly, the power electronics subassembly and the heat sink are arranged in a stacked configuration orthogonal to the axis defined by the rotatable shaft,
the control electronics subassembly is disposed adjacent to the sensing circuit and the power electronics subassembly is disposed adjacent to the control electronics subassembly, wherein the control electronics subassembly is interposed between the power electronics subassembly and the sensing circuit, the heat sink is disposed adjacent to the power electronics subassembly and distal to the control electronics subassembly,
the power electronics subassembly is thermally coupled to the heat sink,
the power electronics subassembly and the control electronics subassembly each include an electrical ground, wherein each of the electrical grounds is electrically connected via the motor endcap to the engine mounting structure,
the power electronics subassembly includes a starter inverter that is electrically connectable to a DC power source,
the control electronics subassembly being in communication with the starter inverter of the power electronics subassembly, and
the power electronics subassembly being electrically connected to the stator of the multi-phase brushless electric motor;
wherein the power electronics subassembly including the starter inverter includes a power circuit board, an electrical current ripple filter, a thermally conductive electrical insulator, and the heat sink that is arranged to absorb heat energy from the power circuit board;
wherein the electrical current ripple filter includes a plurality of filter capacitors, wherein each of the plurality of filter capacitors defines a longitudinal axis;
wherein the longitudinal axes of the filter capacitors are arranged in an equilateral triangle configuration having a center point that is concentric to a pitch circle that is centered on and perpendicular to the axis defined by the rotatable shaft;
wherein the longitudinal axes of the plurality of filter capacitors are parallel to the power circuit board; and
wherein the plurality of filter capacitors are arranged between the power circuit board and a processor circuit board of the control electronics subassembly along the axis.

2. The starter assembly of claim 1, further comprising a rotor position target disposed on the second end of the rotatable shaft, wherein the sensing circuit is disposed to monitor the rotor position target.

3. The starter assembly of claim 2, wherein the rotor position target comprises a radially magnetized ring magnet that is disposed on the second end of the rotatable shaft, and wherein the sensing circuit comprises an off-axis sensing circuit.

4. The starter assembly of claim 2, wherein the rotor position target comprises a diametrically magnetized magnet that is disposed on the second end of the rotatable shaft, and wherein the sensing circuit comprises an on-axis sensing circuit.

5. The starter assembly of claim 1, further comprising a centrally located signal interface to effect communication between the power electronics subassembly and the control electronics subassembly.

6. The starter assembly of claim 1, wherein the pinion gear is disposed to translate along a rotatable member coupled to the rotor.

7. The starter assembly of claim 1, wherein the multi-phase brushless electric motor comprises a three-phase electric machine.

8. The starter assembly of claim 1, further comprising the thermally conductive electrical insulator interposed between the power electronics subassembly and the heat sink.

9. The starter assembly of claim 8, further comprising a plurality of heat transfer vias disposed through the power circuit board to effect thermal communication between a portion of the power electronics subassembly and the heat sink.

10. The starter assembly of claim 8, wherein the thermally conductive electrical insulator is disposed to electrically isolate portions of the power electronics subassembly from the heat sink.

11. The starter assembly of claim 1, wherein the electronic commutator assembly is disposed in a cover.

12. The starter assembly of claim 1, wherein the processor circuit board of the control electronics subassembly and the power circuit board of the power electronics subassembly are disk-shaped.

13. The starter assembly of claim 1, wherein the control electronics subassembly includes the processor circuit board having a high-density printed circuit board including a plurality of gate drivers that are in communication with power switches that are disposed on the power electronics subassembly; wherein the processor circuit board includes a plurality of gap portions that are disposed on the outer circumference thereof to accommodate pass-through of phase leads; wherein the phase leads electrically connect the stator of the multi-phase brushless electric motor and the power circuit board of the starter inverter; wherein the control electronics subassembly includes a digital signal processing controller that is in communication with the plurality of gate drivers and the rotor position sensing circuit; and wherein the control electronics subassembly communicates with the power electronics subassembly via a centrally located interface connection that is formed by a connection between a first connector that is mounted on the control electronics subassembly and a second connector that is mounted on the power electronics subassembly.

14. The starter assembly of claim 1, wherein the power electronics subassembly including the starter inverter is electrically connectable to a 12 V DC power source.

15. A starter assembly for an internal combustion engine, comprising:
a three-phase brushless electric motor including a stator and a rotor disposed on a rotatable shaft, wherein the rotor is coupled to a retractable pinion gear; and
an electronic commutator assembly including a sensing circuit, a control electronics subassembly, a power electronics subassembly and a heat sink;
wherein:
the sensing circuit is disposed to monitor a rotational position of the rotatable shaft,
the control electronics subassembly is disposed adjacent to the sensing circuit, the power electronics subassembly is disposed adjacent to the control electronics subassembly, wherein the control electronics subassembly is interposed between the power electronics subassembly and the sensing circuit,
the heat sink is disposed adjacent to the power electronics subassembly and distal to the control electronics subassembly,
the power electronics subassembly is thermally coupled to the heat sink,
the power electronics subassembly and the control electronics subassembly each including an electrical ground, the electrical ground being electrically connectable to a mounting structure for the starter assembly,
the power electronics subassembly including a starter inverter that is electrically connected to a DC power source, the control electronics subassembly being in communication with the starter inverter of the power electronics subassembly, and the power electronics subassembly being electrically connected to the stator of the three-phase brushless electric motor; and wherein the control electronics subassembly includes a high-density printed circuit board including a plurality of gate drivers that are in communication with power switches that are disposed on the power electronics subassembly;

wherein the control electronics subassembly includes a digital signal processing controller that is in communication with the plurality of gate drivers and the rotor position sensing circuit;

wherein the control electronics subassembly communicates with the power electronics subassembly via a centrally located interface connection which is formed by a connection between a first connector that is mounted on the control electronics subassembly and a second connector that is mounted on the power electronics subassembly;

wherein the power electronics subassembly including the starter inverter includes a power circuit board, an electrical current ripple filter, a thermally conductive electrical insulator, and the heat sink that is arranged to absorb heat energy from the power circuit board;

wherein the electrical current ripple filter includes a plurality of filter capacitors, wherein each of the plurality of filter capacitors defines a longitudinal axis, and wherein the longitudinal axes of the filter capacitors are arranged in an equilateral triangle configuration having a center point that is concentric to a pitch circle that is centered on and perpendicular to the axis defined by the rotatable shaft;

wherein the longitudinal axes of the plurality of filter capacitors are parallel to the power circuit board; and wherein the plurality of filter capacitors are arranged between the power circuit board and the high density circuit board along the axis.

16. The starter assembly of claim 15, wherein the control electronics subassembly, the power electronics subassembly and the heat sink are disposed at a location that is remote from the three-phase brushless electric motor.

17. The starter assembly of claim 15, further comprising a rotor position target disposed on an end of the rotatable shaft, wherein the sensing circuit is disposed to monitor the rotor position target.

18. The starter assembly of claim 17, wherein the rotor position target comprises a radially magnetized ring magnet that is disposed on the end of the rotatable shaft, and wherein the sensing circuit comprises an off-axis sensing circuit.

19. The starter assembly of claim 17, wherein the rotor position target comprises a diametrically magnetized magnet that is disposed on the end of the rotatable shaft, and wherein the sensing circuit comprises an on-axis sensing circuit.

* * * * *